(12) United States Patent
Kim

(10) Patent No.: US 8,125,948 B2
(45) Date of Patent: Feb. 28, 2012

(54) APPARATUS AND METHOD FOR ALLOCATING RADIO FREQUENCY BAND RESOURCE IN SPACE DIVISION MULTIPLE ACCESS SYSTEM

(75) Inventor: Nam-Gi Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1446 days.

(21) Appl. No.: 11/652,374

(22) Filed: Jan. 11, 2007

(65) Prior Publication Data
US 2007/0183312 A1 Aug. 9, 2007

(30) Foreign Application Priority Data
Jan. 11, 2006 (KR) .................. 10-2006-0002984

(51) Int. Cl.
*H04W 4/00* (2009.01)
*H04J 3/16* (2006.01)
*H04B 7/185* (2006.01)
*H04B 1/38* (2006.01)
(52) U.S. Cl. ........ 370/329; 370/437; 455/13.3; 455/561
(58) Field of Classification Search .............. 370/204, 370/210, 211, 277, 278, 281, 282, 328–330, 370/343–345, 347, 431, 436–437, 478, 480, 370/485; 455/13.3–13.4, 23–24, 561, 572, 455/574, 114.2, 115.1, 115.3, 127.1
See application file for complete search history.

(56) References Cited

U.S. PATENT DOCUMENTS

| | | | | |
|---|---|---|---|---|
| 6,463,295 B1 * | 10/2002 | Yun | | 455/522 |
| 6,597,678 B1 * | 7/2003 | Kuwahara et al. | | 370/342 |
| 6,865,393 B1 * | 3/2005 | Baum et al. | | 455/452.2 |
| 6,961,581 B2 * | 11/2005 | Goto et al. | | 455/522 |
| 7,095,709 B2 * | 8/2006 | Walton et al. | | 370/208 |
| 7,406,102 B2 * | 7/2008 | Boesel et al. | | 370/505 |
| 7,627,050 B2 * | 12/2009 | Kim et al. | | 375/267 |
| 2003/0048856 A1 * | 3/2003 | Ketchum et al. | | 375/260 |
| 2003/0128769 A1 * | 7/2003 | Kim et al. | | 375/265 |
| 2004/0042556 A1 * | 3/2004 | Medvedev et al. | | 375/260 |
| 2004/0127223 A1 * | 7/2004 | Li et al. | | 455/446 |
| 2005/0053170 A1 * | 3/2005 | Catreux et al. | | 375/267 |
| 2005/0157639 A1 * | 7/2005 | Song et al. | | 370/208 |
| 2005/0157803 A1 * | 7/2005 | Kim et al. | | 375/260 |
| 2005/0277444 A1 * | 12/2005 | Rensburg et al. | | 455/562.1 |

FOREIGN PATENT DOCUMENTS

| | | |
|---|---|---|
| KR | 1020040044267 | 5/2004 |
| KR | 1020050023187 | 3/2005 |

\* cited by examiner

*Primary Examiner* — Aung S Moe
*Assistant Examiner* — Redentor Pasia
(74) *Attorney, Agent, or Firm* — The Farrell Law Firm, P.C.

(57) ABSTRACT

Provided is an apparatus and method for allocating a radio frequency band resource in a Space Division Multiple Access (SDMA) system. The scheduler allocates a data burst, extracts a surplus power resource from each channel band, redistributes the extracted surplus power resource to the data burst, outputs redistributed transmission power information to a power controller, and outputs allocated burst information and the data burst to a modulation block. The power controller receives the transmission power information from the scheduler, and outputs a weight associated with a transmission power. The multiplier receives a frequency domain signal, multiplies the received frequency domain signal by the weight, and outputs the multiplied result to an IFFT operator.

16 Claims, 5 Drawing Sheets

APPARATUS AND METHOD FOR ALLOCATING RADIO FREQUENCY BAND RESOURCE IN SPACE DIVISION MULTIPLE ACCESS SYSTEM

PRIORITY

This application claims priority under 35 U.S.C. §119 to an application filed in the Korean Intellectual Property Office on Jan. 11, 2006 and assigned Serial No. 2006-2984, the contents of which are incorporated herein by reference.

BACKGROUND OF THE INVENTION

1. Field of the Invention

The present invention relates generally to an apparatus and method for measuring and redistributing transmission power when allocating a radio frequency band resource in a Space Division Multiple Access (SDMA) system.

The present invention provides a technique for efficiently allocating a radio resource when integrating and allocating several bands to a Mobile Station (MS) in a Space Division Multiple Access (SDMA) system for dividing the radio resource into a frequency band and allocating the divided radio resource.

2. Description of the Related Art

An Institute of Electrical and Electronic Engineers (IEEE) 802.16 Wireless Metropolitan Area Network (MAN) system is a typical example of an SDMA system for dividing a radio resource into a frequency band and allocating the divided radio resource.

FIG. 1 illustrates the downlink frame architecture used in the SDMA system.

Referring to FIG. 1, a DownLink (DL) frame of the SDMA system is divided into preamble and MAP information on an entire frame, a Non Adaptive Antenna System (AAS) traffic zone not supporting SDMA, and an AAS zone supporting the SDMA. The AAS zone is again divided into 12 bands based on a frequency axis. A data burst is provided on a per-band basis and transmitted to an MS. Each band has channel qualities different from each other for one MS.

The AAS zone has a minimum size of one band as a radio resource allocated to the MS. However, in case where the MS sends a request for allocating a data burst having a size of one or more bands to a Base Station (BS), the BS can merge several bands into one data burst and allocate the radio resources. Particularly, when receiving only one data burst per frame because, of limitation to its performance or a need to reduce the MAP information in size, the MS necessarily needs a method for merging several bands into one data burst and allocating a radio resource.

An inefficient example of merging a plurality of channel bands into the data burst and allocating the radio resource will be described with reference to FIG. 2 below.

FIG. 2 illustrates an example of allocating, by the BS, the data burst including the plurality of channel bands in the SDMA system.

Referring to FIG. 2, the BS merges AAS Bands #1, #2, and #3 into one data burst, and allocates a radio resource to the MS. Resource #1 and Resource #2 refer to radio resources allocated to the same position by the SDMA system. The Resource #1 is allocated to a User #1 MS, and the Resource #2 to a User #2 MS.

In FIG. 2, the BS fixedly distributes a transmission power (PWR) by 0.5 on a per-resource basis. When the BS distributes the transmission power by 0.5, the MS has a Carrier to Interference and Noise Ratio (CINR) and a Modulation order Product code Rate (MPR) corresponding to the CINR at each band as shown in FIG. 2. In this case, a fixed transmission power per band is 0.5 because the User #1 MS and the User #2 MS share the Resource #1 and the Resource #2, the radio resources of the same position. Here, the MPR, which is a rate of an amount of information transmitted using the radio resource of the same size, corresponds to the CINR.

In case where the transmission power is distributed by 0.5 as shown in FIG. 2, AAS Band #1 and AAS Band #3 of the Resource #1 have an MPR of 1.5 but AAS Band #2 has an MPR of 0.5. Therefore, the User #1 MS has available a final Target MPR of 0.5. Accordingly, the User #1 MS is inefficient because a low CINR of the AAS Band #2 of the Resource #1 results in reduction of a total Target MPR. Alternatively, AAS Band #2 of the Resource #2 has an MPR of 2.0 but AAS Band #1 and AAS Band #3 have an MPR of 1.0 when the transmission power is fixedly distributed by 0.5. Therefore, the User #2 MS has a Target MPR of 1.0 and thus, results in a waste of the transmission power in the AAS Band #2 of the Resource #2.

SUMMARY OF THE INVENTION

Accordingly, the present invention provides a method for efficiently distributing transmission power by considering MS channel qualities different from each other in every band, thereby effectively allocating a radio resource when merging and allocating a frequency band.

An aspect of the present invention is to substantially solve at least the above problems and/or disadvantages and to provide at least the advantages below. Accordingly, an aspect of the present invention is to provide an apparatus and method for merging and allocating a radio frequency band resource in a Space Division Multiple Access (SDMA) system.

Another aspect of the present invention is to provide a apparatus and method for measuring and redistributing a wasted or over-allocated transmission power when merging and allocating a radio frequency band resource in an SDMA system.

A further aspect of the present invention is to provide a apparatus and method for merging and allocating a radio frequency band resource in an SDMA system for allocating a data burst having one or more channel bands, extracting a surplus power resource from each channel band, redistributing the extracted surplus power resource to the data burst, and outputting the data burst by the redistributed transmission power.

The above aspects are achieved by providing a apparatus and method for merging and allocating a radio frequency band resource in an SDMA system.

According to one aspect of the present invention, there is provided a apparatus for allocating a radio frequency band resource in a Space Division Multiple Access (SDMA) system. The apparatus includes a scheduler, a power controller, and a multiplier. The scheduler allocates a data burst having one or more channel bands, extracts a surplus power resource from each channel band, redistributes the extracted surplus power resource to the data burst, outputs redistributed transmission power information to a power controller, and outputs allocated burst information and the data burst to a modulation block. The power controller receives from the scheduler the transmission power information on a per-channel-band basis, and outputs to the multiplier a weight associated with a transmission power. The multiplier receives from the modulation block a frequency domain signal, multiplies the received frequency domain signal by the weight received from the power controller, and outputs the multiplied result to an Inverse Fast Fourier Transform (IFFT) operator.

According to another aspect of the present invention, there is provided a method for allocating a radio frequency band resource in an SDMA system. The method includes allocating data bursts having one or more channel bands; measuring a Carrier to Interference and Noise Ratio (CINR) of each channel band included in the data burst that is allocated when a transmission power is equally and fixedly distributed; measuring a Modulation order Product code Rate (MPR) corresponding to the CINR of each channel band; equalizing the MPR of each channel band of the data burst to a least MPR among the MPRs of the channel bands in a unit of the allocated data burst, and measuring a surplus power resource resulting from the equalization; adding the surplus power resources of the data bursts, and calculating a total surplus power resource; measuring an additional power resource required for an MPR increased by a predetermined level in the data burst unit; and determining for redistribution if there exists a data burst needing an additional power resource less than or equal to the total surplus power resource.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a apparatus and method for merging and allocating a radio frequency band resource in a Space Division Multiple Access (SDMA) system. A description will be made with reference to FIGS. 3 to 5 below.

Figure 3:
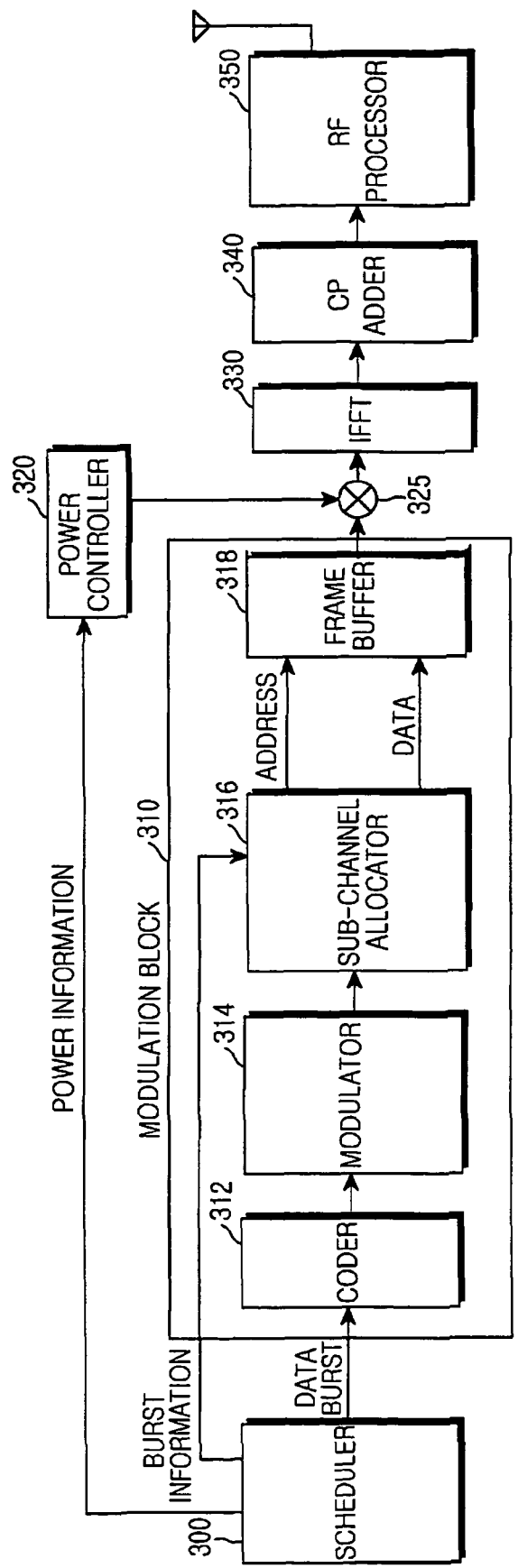
FIG. 3 illustrates architecture of a broadband wireless communication system according to the present invention.

FIG. 3 illustrates architecture of a broadband wireless communication system according to the present invention.

Referring to FIG. 3, the inventive broadband wireless communication system includes a scheduler 300, a modulation block 310, a power controller 320, a multiplier 325, an Inverse Fast Fourier Transform (IFFT) operator 330, a Cyclic Prefix (CP) adder 340, and a Radio Frequency (RF) processor 350. The modulation block 310 includes a coder 312, a modulator 314, a sub-channel allocation 316, and a frame buffer 318.

The scheduler 300 allocates to a receiver a data burst with one or more channel bands, extracts a surplus power resource from each channel band, redistributes the extracted surplus power resource to the data burst, outputs redistributed transmission power information to the power controller 320, outputs allocated burst information to the sub-channel allocation 316, and outputs the data burst to the coder 312. A method for redistributing a transmission power by the scheduler 300 will be later described with reference to FIG. 4 below.

The coder 312 receives the data burst from the scheduler 300, and channel-codes the received data burst depending on a predetermined coding rate. The modulator 314 receives the data burst from the coder 312, and modulates the received data burst in a modulation method. The modulation method can use, for example, Quadrature Phase Shift Keying (QPSK), 16-Quadrature Amplitude Modulation (16-QAM), and 64-QAM.

The sub-channel allocator 316 receives the data burst from the modulator 314, and creates a physical address to map the received data burst to the frame buffer 318 using the burst information logically allocated by the scheduler 300.

The frame buffer 318 arranging a sequence of the data burst, receives from the sub-channel allocation 316 the data burst and the physical address for data mapping, allocates the data burst according to the physical address, and outputs the allocated data burst to the multiplier 325.

The power controller 320 receives the transmission power information on a per-channel-band basis from the scheduler 300, and outputs to the multiplier 325 a weight associated with the transmission power.

The multiplier 325 receives a frequency domain signal from the frame buffer 318, multiplies the received frequency domain signal by the weight received from the power controller 320, and outputs the multiplied result to the IFFT operator 330.

The IFFT operator 330 processes, by IFFT, the frequency domain signal multiplied by the weight and received from the multiplier 325, and transforms the frequency domain signal into a time domain signal.

The CP adder 340 adds a cyclic prefix to sample data received from the IFFT operator 330, to eliminate Inter Symbol Interference (ISI) caused by radio channel multipath fading.

The RF processor 350 increases a frequency of a baseband signal received from the CP adder 340, converts the baseband signal into an RF signal, and transmits the RF signal through an antenna.

Figure 4:
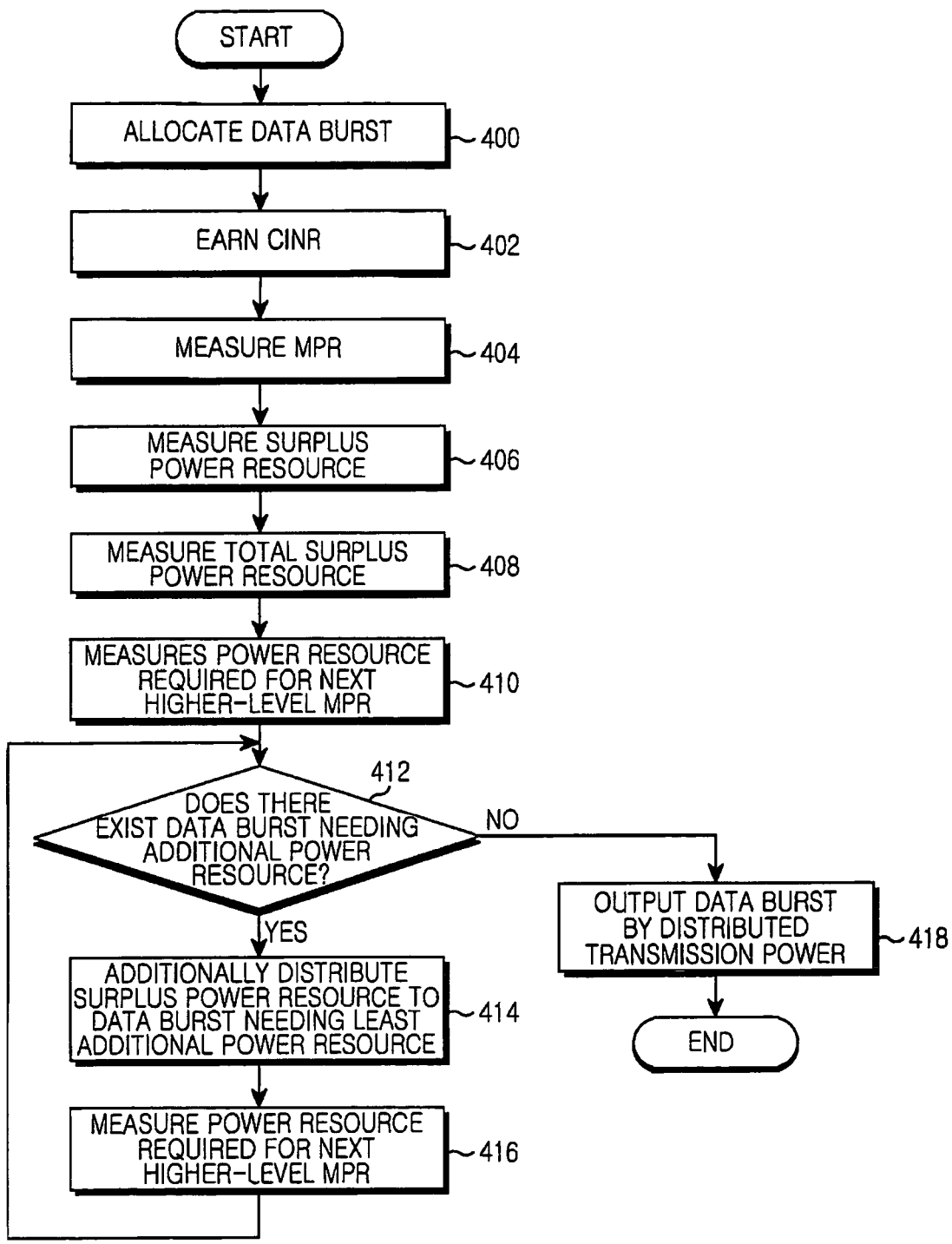
FIG. 4 is a flowchart illustrating a method for merging and allocating a radio frequency band resource, and redistributing and transmitting a transmission power resource of each band in an SDMA system according to the present invention.

FIG. 4 is a flowchart illustrating the method for merging and allocating the radio frequency band resource, and redistributing and transmitting the transmission power resource of each band in the SDMA system according to the present invention.

In the SDMA system, a transmitter allocates the data burst having one or more channel bands to a Mobile Station (MS) in Step 400.

The allocated data burst of the Step 400 can include a plurality of channel bands. The data bursts included in one frame all have the same number of channel bands.

After allocating the data burst in the Step 400, in Step 402, the transmitter earns a Carrier to Interference and Noise Ratio (CINR) of each channel band included in the data burst that is allocated when the transmission power is equally and fixedly distributed. The earning of CINR is performed by measuring the CINR on the received data or by receiving a CINR information feedback from the receiver. After that, the transmitter measures a Modulation order Product code Rate (MPR) corresponding to the CINR of each channel band in Step 404.

Table 1 below shows a relationship between the measured MPR and CINR.

TABLE 1

| CINR (dB) | MPR | MCS level |
|---|---|---|
| 3 to 11 | 0.17 | QPSK 1/2 repetition 6 |
| 12 to 14 | 0.25 | QPSK 1/2 repetition 4 |
| 15 to 17 | 0.5 | QPSK 1/2 repetition 2 |
| 18 to 20 | 1.0 | QPSK 1/2 repetition 1 |
| 21 to 23 | 1.5 | QPSK 2/3 |
| 24 | 2.0 | 16 QAM 1/2 |
| 25 | 3.0 | 16 QAM 3/4 |
| 26 | 4.0 | 64 QAM 2/3 |
| 27 | 5.0 | 64 QAM 5/6 |

Referring to Table 1, the MPR, which is a rate of an amount of information transmitted using the radio resource of the same size, is distinguished into a plurality of levels. Each level of the MPR corresponds to the CINR. Modulation and Coding Scheme (MCS) level is decided depending on the level of the MPR.

After measuring the MPR on a per-channel-band basis in the Step 404, in Step 406, the transmitter equalizes the MPR of each channel band of the data burst to the least MPR among the MPRs of the channel bands by a unit of the allocated data burst, and measures the surplus power resource that is a residual power resulting from the equalization. In Step 408, the transmitter adds up the surplus power resources of the respective data bursts, and calculates a total surplus power resource. In Step 410, the transmitter measures an additional power resource required for a higher-level MPR in the data burst unit. In Step 412, the transmitter determines if there exists a data burst that needs additional power resources less than or equal to the total surplus power resource.

When it is determined that there exists a data burst in need of additional power resource less than or equal to the total surplus power resource in the Step 412, the transmitter additionally redistributes the surplus power resource to a data burst least needing the additional power resource among the data bursts in Step 414. In Step 416, the transmitter measures an additional power resource required for a next higher-level MPR of the data burst additionally distributed the surplus power resource, and it returns to the Step 412.

When it is determined that there does not exist the data burst needing the additional power resource less than or equal to the total surplus power resource in the Step 412, the transmitter outputs the data burst by the redistributed transmission power in Step 418.

An example of improving inefficient transmission power distribution shown in FIG. 2 will be described with reference to FIG. 5 below, in the context of the flowchart of FIG. 4.

Figure 5:
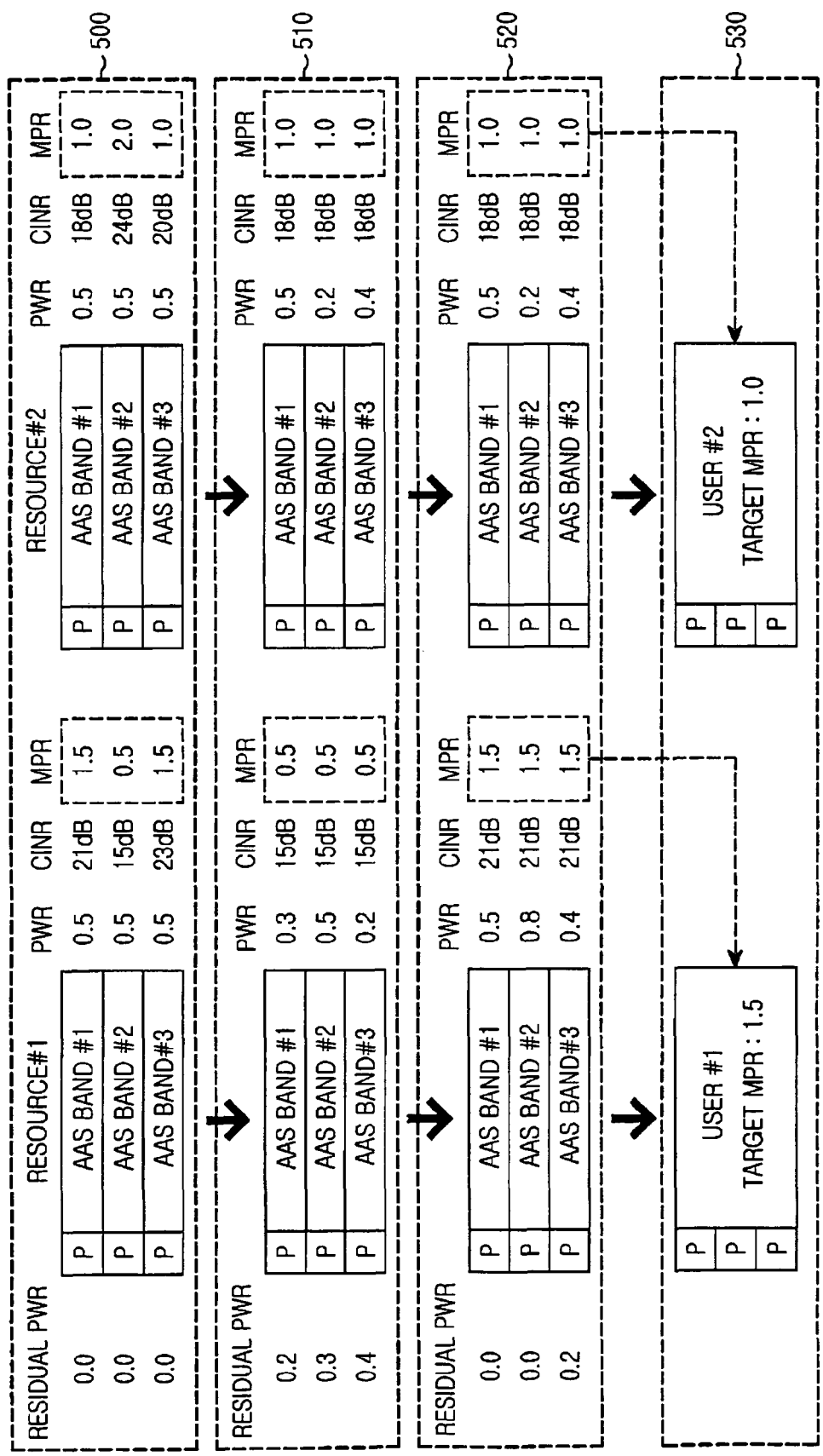
FIG. 5 illustrates an example of redistributing a transmission power in an SDMA system according to the present invention.

FIG. 5 illustrates an example of redistributing the transmission power in the SDMA system according to the present invention.

Figure 1:
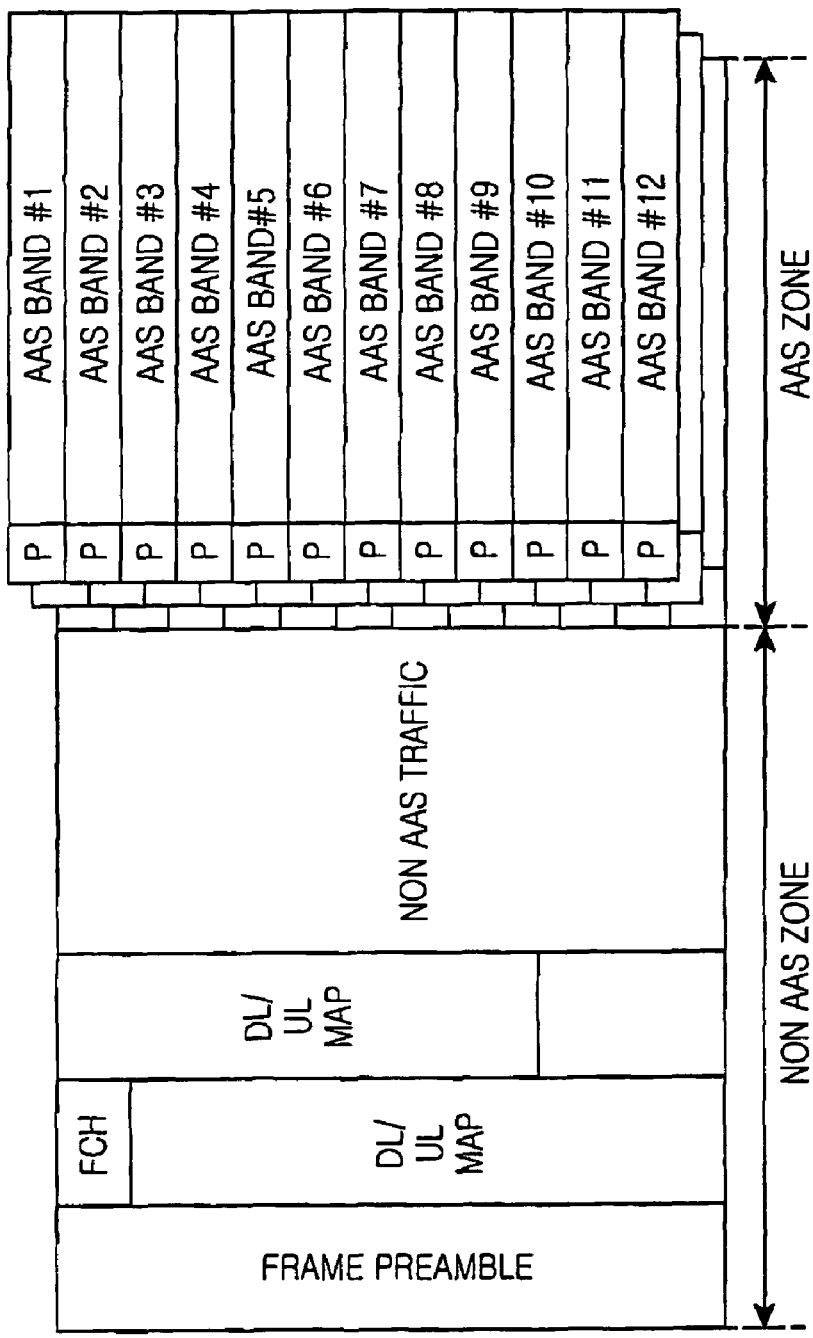
FIG. 1 illustrates a downlink frame architecture used in a Space Division Multiple Access (SDMA) system.
Figure 2:
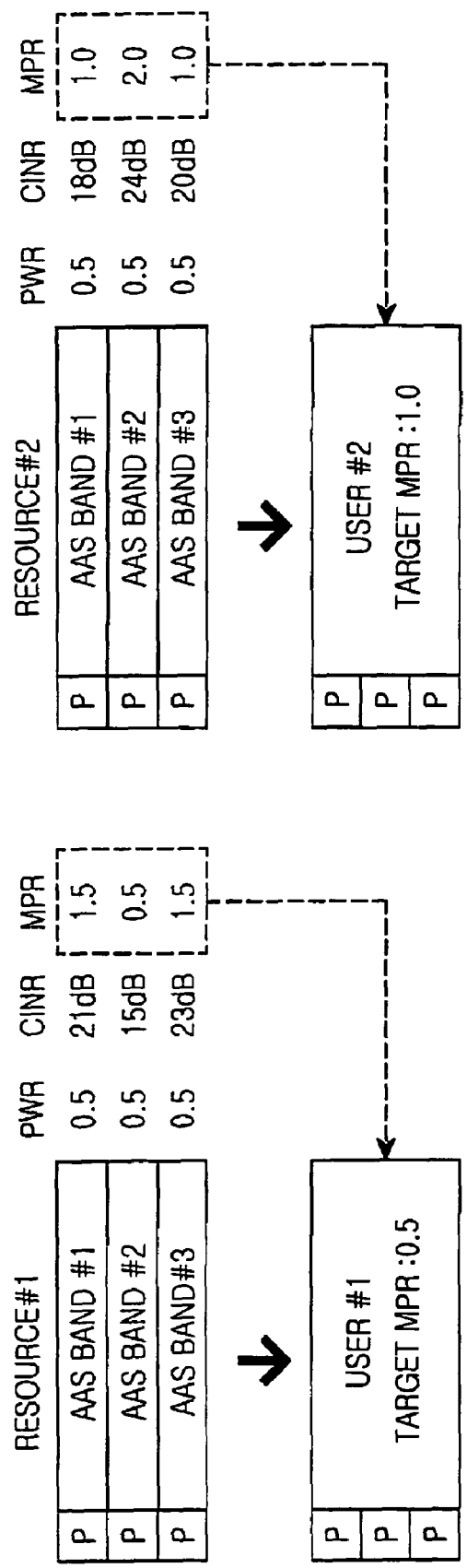
FIG. 2 illustrates an example of allocating, by a Base Station (BS), a data burst including a plurality of channel bands in an SDMA system.

Referring to FIG. 5, Step 500 shows a state where the same predetermined amount of transmission power is supplied to each channel band of a data burst of FIG. 2. Step 510 shows a state where the total surplus power resource is measured and extracted as in the Step 408 of FIG. 4. Step 520 shows a state where the total surplus power resource is redistributed. Step 530 shows a state where the plurality of channel bands are merged into one data burst and transmitted at an MPR determined by the redistributed transmission power.

As described above, the present invention provides the apparatus and method for merging and allocating the radio frequency band resource in the SDMA system for allocating the data burst having one or more channel bands, extracting the surplus power resource from each channel band, redistributing the extracted surplus power resource to the data burst, and outputting the data burst using the redistributed transmission power. The present invention provides the apparatus and method for redistributing the wasteful surplus transmission power, thereby effectively allocating the radio resource when merging and allocating the frequency band.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for allocating a radio frequency band resource in a Space Division Multiple Access (SDMA) system, the apparatus comprising:
   a scheduler for allocating a data burst having one or more channel bands, outputting to a modulation block the data burst, measuring a Modulation order Product code Rate (MPR) of each channel band of the data burst, measuring a surplus power resource generated by equalizing the MPR of each channel band to a least MPR among the MPRs of the channel bands, determining transmission power of each channel band of the data burst using the surplus power resource, and outputting to a power controller transmission power information;
   the modulation block for channel-coding and modulating the data burst, mapping the data burst on frequency domain, and outputting a frequency domain signal;
   the power controller for receiving from the scheduler the transmission power information on a per-channel-band basis, and outputting to a multiplier a weight associated with a transmission power; and
   the multiplier for receiving from the modulation block the frequency domain signal, multiplying the frequency domain signal received from the power controller by the weight received, and outputting the multiplied result to an Inverse Fast Fourier Transform (IFFT) operator.

2. The apparatus of claim 1, wherein the modulation block comprises:
   a coder for receiving the data burst from the scheduler, channel-coding the received data burst at a predetermined coding rate, and outputting to a modulator the coded data burst;
   the modulator for receiving from the coder the data burst, modulating the received data burst in a corresponding modulation method, and outputting to a sub-channel allocation the modulated data burst;
   the sub-channel allocator for receiving from the modulator the data burst, creating a physical address to map the received data burst to a frame buffer using the burst information logically allocated by the scheduler; and
   the frame buffer for arranging a sequence of the data burst, for receiving from the sub-channel allocator the data burst and the physical address for mapping the data burst, allocating the data burst depending on the physical address, and outputting the allocated data burst to the multiplier.

3. The apparatus of claim 1, wherein the SDMA system further comprises:
   the IFFT operator for processing, by IFFT, the frequency domain signal multiplied by the weight and received from the multiplier, and transforming the frequency domain signal into a time domain signal;
   a Cyclic Prefix (CP) adder for adding a CP to sample data received from the IFFT operator to eliminate Inter Symbol Interference (ISI) caused by radio channel multipath fading; and a Radio Frequency (RF) processor for increasing a frequency of a baseband signal received from the CP adder, converting the baseband signal into a RF signal, and transmitting the RF signal through an antenna.

4. The apparatus of claim 1, wherein the scheduler for extracting and redistributing the surplus power resource measures a Carrier to Interference and Noise Ratio (CINR) of each channel band comprised in the data burst that is allocated when the transmission power is equally distributed, measures a Modulation order Product code Rate (MPR) corresponding to the CINR of each channel band, equalizes the MPR of each channel band of the data burst to a least MPR among the MPRs of the channel bands, in a unit of the allocated data burst, and measures the surplus power resource resulting from the equalization, adds the surplus power resources of the data bursts, and calculates a total surplus power resource, measures an additional power resource required for a next higher-level MPR in the data burst unit, determines if there exists a data burst that needs an additional power resource less than or equal to the total surplus power resource, and additionally redistributes the surplus power resource to the data burst least needing the additional power resource among the data bursts when the determination result is that there exists the data burst.

5. The apparatus of claim 4, wherein the scheduler repeatedly redistributes the surplus power resource until there does not exist a data burst needing an additional power resource less than or equal to the total surplus power resource.

6. The apparatus of claim 4, wherein the MPR, which is a rate of an amount of information transmitted using a radio resource of the same size, is distinguished into a plurality of levels, and a Modulation and Coding Scheme (MCS) level is decided based on each level of the MPR corresponding to the CINR.

7. The apparatus of claim 1, wherein the data burst can include a plurality of channel bands, and the data bursts included in one frame all have the same number of channel bands.

8. A method for allocating a radio frequency band resource in a Space Division Multiple Access (SDMA) system, the method comprising the steps of:
allocating data bursts having one or more channel bands;
measuring a Carrier to Interference and Noise Ratio (CINR) of each channel band included in the data burst that is allocated when a transmission power is equally distributed;
measuring a Modulation order Product code Rate (MPR) corresponding to the CINR of each channel band;
equalizing the MPR of each channel band of the data burst to a least MPR among the MPRs of the channel bands in a unit of the allocated data burst, and measuring a surplus power resource resulting from the equalization;
adding the surplus power resources of the data bursts, and calculating a total surplus power resource;
measuring an additional power resource required for an MPR increased by a predetermined level in the data burst unit; and
determining for redistribution if there exists the data burst that needs an additional power resource less than or equal to the total surplus power resource.

9. The method of claim 8, further comprising:
additionally redistributing the surplus power resource to the data burst least needing the additional power resource among the data bursts when it is determined that there exists the data burst needing the additional power resource less than or equal to the total surplus power resource; and
measuring an additional power resource required for a next higher-level MPR of the data burst additionally distributed the surplus power resource, and returning to the checking for redistribution.

10. The method of claim 8, further comprising:
outputting the data burst by the redistributed transmission power when it is determined that there does not exist the data burst needing the additional power resource less than or equal to the total surplus power resource.

11. The method of claim 8, wherein the data burst can include a plurality of channel bands, and the data bursts included in one frame all have the same number of channel bands.

12. The method of claim 8, wherein the MPR, which is a rate of an amount of information transmitted using a radio resource of the same size, is distinguished into a plurality of levels, and a Modulation and Coding Scheme (MCS) level is decided depending on each level of the MPR corresponding to the CINR.

13. A method for allocating a radio frequency band resource in a Space Division Multiple Access (SDMA) system, the method comprising the steps of:
allocating data bursts having one or more channel bands;
measuring a Carrier to Interference and Noise Ratio (CINR) of each channel band included in the data burst;
measuring a Modulation order Product code Rate (MPR) corresponding to the CINR of each channel band;
measuring a surplus power resource generated by equalizing the MPR of each channel band of the data burst to a least MPR among the MPRs of the channel bands in a unit of the allocated data burst;
calculating a total surplus power resource; and
measuring an additional power resource required for an MPR increased by a predetermined level in the data burst unit.

14. The method of claim 13, further comprising:
redistributing the surplus power resource to the data burst least needing the additional power resource among the data bursts if there exists the data burst needing the additional power resource less than or equal to the total surplus power resource; and
measuring an additional power resource required for a next higher-level MPR of the data burst additionally distributed the surplus power resource, and returning to the checking for redistribution.

15. The method of claim 13, wherein the data burst can include a plurality of channel bands, and the data bursts included in one frame all have the same number of channel bands.

16. The method of claim 13, wherein the MPR, which is a rate of an amount of information transmitted using a radio resource of the same size, is distinguished into a plurality of levels, and a Modulation and Coding Scheme (MCS) level is decided depending on each level of the MPR corresponding to the CINR.

* * * * *